United States Patent Office 2,693,984
Patented Nov. 9, 1954

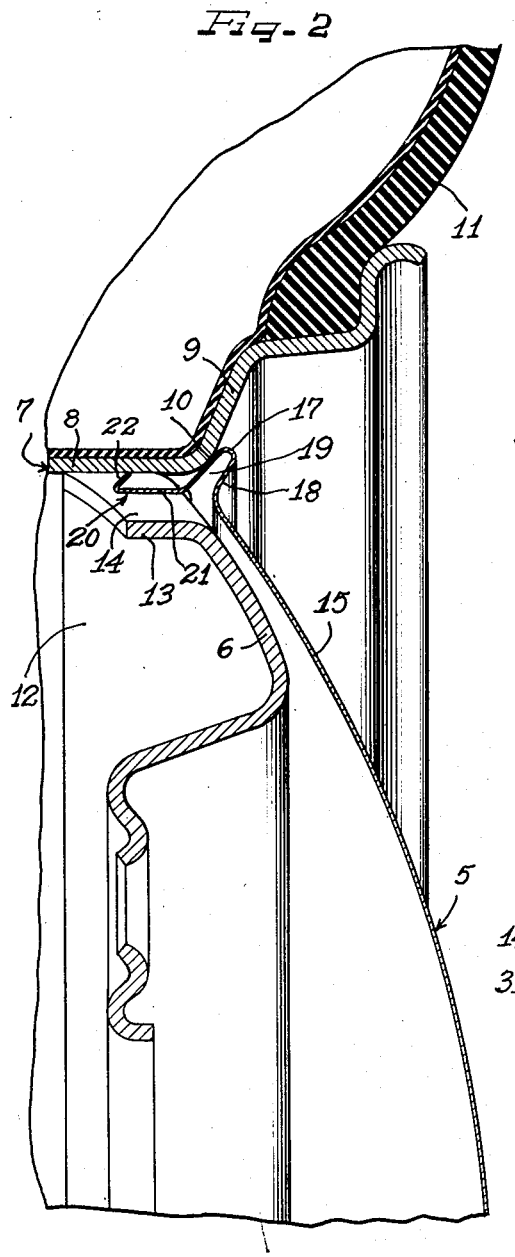

2,693,984

WHEEL STRUCTURE

George Albert Lyon, Detroit, Mich.

Application May 9, 1950, Serial No. 160,956

5 Claims. (Cl. 301—37)

The present invention relates to improvements in wheel structures and more particularly concerns the ornamental and protective covering of the outer side of vehicle wheels.

An important object of the present invention is to provide a vehicle wheel with an improved cover.

Another object of the invention is to provide an improved wheel cover having self-retaining means integral therewith.

A further object of the invention is to provide an improved one-piece wheel cover which is adapted to be applied to a vehicle wheel by pressing the same into position on the wheel and which can be readily pried free from the wheel when desired.

Yet another object of the invention is to provide an improved vehicle wheel cover having thereon retaining finger or clip means engageable with the wheel within the usual wheel openings at juncture between the wheel body and the tire rim.

According to the general features of the present invention there is provided in a wheel structure including a wheel body and a tire rim with openings at juncture between the body and rim, a cover for the outer side of the wheel comprising a circular member having a plurality of axially inwardly extending retaining members engageable with the wheel within said openings and a juncture rib between said retaining elements and the body of the cover and projecting generally radially and axially outwardly and being engageable by a pry-off tool for disengaging the cover from the wheel.

According to other general features of the invention the rib rests against the tire rim.

According to other general features of the invention the rib is spaced radially inwardly from the tire rim to afford a gap into which a pry-off tool can be inserted for engagement behind the rib in prying the cover from the wheel.

Other objects, features and advantages of the present invention will be readily apparent from the following detailed description of a preferred embodiment thereof taken in conjunction with the accompanying drawings in which:

Figure 1 is a side elevational view of a vehicle wheel showing a practical embodiment of the invention, with certain parts broken away for clarity of illustration;

Figure 2 is an enlarged radial sectional view taken substantially on the line II—II of Figure 1; and Figure 3 is a fragmentary radial sectional view similar to Figure 2 but showing a modified form of cover.

As shown on the drawings:

A cover 5 (Figs. 1 and 2) according to the present invention is adapted to be applied to the outer side of a vehicle wheel including a body portion 6 and a tire rim 7. The tire rim comprises a base flange 8 which merges with a side flange 9 on a rounded shoulder 10. The tire rim is of the multi-flange type adapted to support a drop-center pneumatic tire and tube assembly 11.

The wheel body 6 has a marginal flange 12 which is secured in any suitable fashion to the base flange 8 of the tire rim and at appropriate intervals, such as four equally spaced intervals, the base flange 12 is inset to provide inset flange portions 13 defining respective wheel openings 14.

The wheel cover 5 is adapted to substantially cover the outer side of the wheel and for this purpose comprises a crowned disk including a body portion 15 of a magnitude and extent to cover substantially the entire wheel body 6 and in this instance the juncture portion of the tire rim 7.

At the perimeter of the body portion 15 is provided an annular rigidifying, reinforcing generally radially outwardly and axially outwardly extending rib 17 of substantial width. At its outer side the rib 17 comprises an annular flange panel 18. At its inner side the rib 17 comprises an annular panel flange 19 spaced inwardly from the flange 18. The flanges 18 and 19 are joined in one piece by a rounded bead-like juncture which affords a substantial stiffening for the rib.

In assembly of the cover with the wheel, the inner underturned flange 19 of the marginal rib 17 of the cover is arranged to bear against the juncture shoulder 10 between the base flange and the side flange of the tire rim.

The inner edge of the rib underturned flange 19 in assembly extends to a position opposite the wheel openings 14 spaced radially inwardly from the tire rim base flange 8.

For retaining the cover on the wheel, the underturned rib flange 19 is provided with a plurality of axially inwardly extending retaining elements 20 engageable with a portion of the wheel. In the present instance the retaining elements 20 comprise axially inward finger extensions angularly related to the flange 19 having body portions 21 and generally radially and axially outwardly extending short terminal finger flange portions 22. The tips of the finger terminal flanges 22 are arranged to engage in retaining gripping relation against the inner face of the tire rim base flange 8. It will be observed that the body portions 21 of the fingers are of substantial length and are thus of substantial flexible resilience. On the other hand the short terminal flanges 22 are relatively stiff and this stiffness is enhanced by the angular divergent juncture with the body portions 21. Hence, by having the body portions 21 initially angled so that the tips of the finger terminals 22 extend to a diameter greater than the inside diameter of the tire rim base flange 8, on attachment of the cover to the wheel, the terminal flanges 22 will be forced radially inwardly and thus place the long flexible resilient body portions 21 of the retaining fingers under tension which reacts to maintain the tips of the finger terminals 22 in secure wedging gripping engagement against the tire rim base flange. There are of course as many of the retaining fingers 20 as there are wheel openings 14.

In applying the cover to the outside of a wheel the cover is generally centered with respect to the wheel with the retaining fingers 20 in registration with the wheel openings 14. Then the cover is pressed inwardly so that the retaining terminal flange portions 22 of the fingers cam in along the shoulders 10 of the tire rim and then slide axially inwardly along the inner face of the tire rim base flange 8 until the generally axially and radially inwardly angled diagonal flange 19 comes to rest against the shoulder 10.

In order to remove the cover the simple expedient of applying a pry-off tool under and behind the marginal reinforcing outwardly projecting rib 17 is resorted to. By applying pry-off leverage to the rib 17, the retaining fingers 20 are gradually worked axially outwardly free from the tire rim base flange 8. In this pry-off, the flexibility of the body portions 21 of the retaining fingers is of substantial advantage since the cover can thereby yield in a generally radial direction to relieve the finger or retaining fingers adjacent the point of pry-off of substantial resilient tension until the cover has been pried free. This flexing is also enhanced by the substantial spaced relation between the cover finger body portions 21 and the adjacent wheel body wheel opening flanges 13.

In the modification of Fig. 3, the wheel is of substantially the same construction as the wheel shown in Fig. 2 and therefore similar reference numerals indicate similar parts. However, a somewhat modified cover 5' is used.

The cover 5' includes a cover body 23 which is of a diameter to substantially cover the outer side of the wheel body 6 and is formed at its radially outer margin with a generally radially outwardly and axially outwardly projecting bead or rib 24. The rib is of substantial width and includes an annular outer panel flange 25 and an inner generally radially and axially inwardly extending annular panel flange 27 in spaced relation to the flange 25 and joined thereto on an integral one piece rounded juncture. This provides a substantially rigid annular marginal reinforcement for the cover. The outside diameter and axially outward projection of the rib 24 are such in relation to the adjacent marginal portion of the cover radially inwardly from the flange 25 that in the assembled relationship of the cover with the wheel the rib 24 remains in spaced relation to the shoulder 10 of the tire rim when the cover body engages against the wheel body.

For retaining the cover on the wheel, the cover 5' is provided with integral retaining elements 28 formed in one piece therewith and comprising resilient spring clips each of which includes a resilient body portion 29 and a retaining terminal generally radially inwardly projecting shoulder formation 30 engageable behind the edge of the wheel body opening in said flange 13. The retaining clip shoulder portions 30 normally project to a smaller diameter than the outside diameter defined by the flanges 13 so that when the cover is centered upon the wheel with the generally radially and axially inwardly projecting cam terminal flanges 31 on the clips engaging at the outer side of the wheel at the wheel openings, the cover can be pushed home by camming of the cam portions 31 against the flanges 13 and then snapping of the shoulder portions 30 behind the edges of the flanges 13 when the cover is fully engaged with the wheel body 6. It will be observed that the shoulder at juncture of the flange 25 with the cover body 23 in the final assembly of the cover with the wheel rests against the wheel body radially inwardly from the wheel openings 14. The shoulder formation 30 is formed with a cam surface 32 wihch engages against the edge of the contiguous wheel body flange 13 with a camming inwardly drawing action so that the cover is firmly held against the wheel body.

When it is desired to remove the cover from the wheel a pry-off tool can be readily inserted into the gap between the rib 24 and the shoulder 10 on the tire rim and pry-off force applied to release the clips 28 and thus remove the cover from the wheel.

Both of the covers 5 and 5' may be made from appropriate gauge sheet metal such as sheet stainless steel which may be polished or plated or otherwise provided with a suitable exterior finish. By reason of the reinforcing and stiffening marginal rib structure on the covers relatively thin sheet metal may be used. By work hardening the marginal rib structures and the retaining extension members proper cover-retaining resilience is attained in the retaining extensions and at the same time the margin of the cover is adequately stiffened to meet all necessary service requirements.

The covers of the present invention are also very economical since they are made from a single sheet metal stamping.

It will also be observed that the covers are in a sense mounted on the wheel in floating condition since they are adapted to have a certain amount of radial movement relative to the wheel due to the flexibility of the retaining elements and are thus well adapted to absorb shocks thereagainst during service.

It will also be observed that the cover of the present invention is entirely independent of any possible relative axial variation in the disposition of the tire rim and wheel body of various wheels and which will in actual practice vary to some extent. The cover is entirely supported on either the tire rim or the wheel body and thus it makes no difference how much variation there is in the axial relative placement of the wheel parts.

It will be understood that modifications and variations may be effected without departing from the scope of the novel concepts of the present invention.

I claim as my invention:

1. In a wheel structure including a wheel body and a tire rim wherein the tire rim has a base flange secured to the wheel body and a generally radially outwardly extending side flange joining the base flange on a rounded juncture, while the wheel body has wheel openings at juncture with the tire rim, a cover for disposition at the outer side of the wheel and including a circular body to lie opposite the wheel body and of a diameter to have the outer margin extend opposite said wheel openings, said outer margin having a generally radially and axially outwardly directed marginal reenforcing fold including an underturned annular panel flange extending generally axially and radially inwardly at the axially inner side of the fold in substantial spaced relation to the outer side portion of the fold and opposing said rounded juncture between the tire rim base and side flanges, said fold defining a pry-off annular rib having its perimeter of beadlike rounded cross-section and of a diameter to lie close to said rounded juncture to facilitate reception of a pry-off tool between the rib and the rounded juncture, said underturned flange having extending therefrom retaining clip means engaging the wheel in said wheel openings.

2. In a wheel structure including a wheel body and a tire rim wherein the tire rim has a base flange secured to the wheel body and a generally radially outwardly extending side flange joining the base flange on a rounded juncture, while the wheel body has wheel openings at juncture with the tire rim, a cover for disposition at the outer side of the wheel and including a circular body to lie opposite the wheel body and of a diameter to have the outer margin extend opposite said wheel openings, said outer margin having a generally radially and axially outwardly directed marginal fold including an underturned flange extending generally axially and radially inwardly at the axially inner side of the fold and opposing said rounded juncture between the tire rim base and side flanges, said underturned flange having extending therefrom retaining clip means engaging the wheel in said wheel openings, said underturned flange resting against said rounded tire rim flange juncture and supporting the body of the cover in spaced relation to the body of the wheel.

3. In a wheel structure including a tire rim and a wheel body with wheel openings in the wheel body at juncture with the tire rim, a cover for disposition at the outer side of the wheel including a circular cover body having a marginal portion disposed adjacent to the tire rim and including axially inwardly extending retaining fingers including body portions spaced from both the tire rim and the wheel body within said wheel openings and including generally radially and axially outwardly extending short gripping and retaining fingers grippingly engaging the tire rim and being flexibly deflectable to enable bodily radial movement of the cover responsive to radial pressure thereagainst as by application of a pry-off tool to the margin of the cover for prying the cover from the wheel by prying said retaining fingers from engagement with the tire rim.

4. A wheel structure as defined in claim 1 wherein the said underturned annular panel flange lies against said rounded tire rim juncture and said retaining clips have the retaining tip portions retainingly engaging the tire rim.

5. A wheel structure as defined in claim 1 wherein said underturned annular panel flange lies in radially inward spaced relation to said rounded juncture on the tire rim and said retaining clip means include retaining terminal portions engageable retainingly with the wheel body.

References Cited in the file of this patent

UNITED STATES PATENTS

| Number | Name | Date |
|---|---|---|
| 1,944,658 | Griffith | Jan. 23, 1934 |
| 2,186,550 | Lyon | Jan. 9, 1940 |
| 2,198,056 | Lyon | Apr. 23, 1940 |
| 2,279,331 | Lyon | Apr. 14, 1942 |
| 2,279,333 | Lyon | Apr. 14, 1942 |
| 2,551,327 | Horn | May 1, 1951 |

FOREIGN PATENTS

| Number | Country | Date |
|---|---|---|
| 357,213 | Great Britain | Sept. 14, 1931 |